United States Patent
Miller et al.

[15] 3,679,076
[45] July 25, 1972

[54] METHOD AND APPARATUS FOR HANDLING SHEET MATERIAL

[72] Inventors: Alfred H. Miller, Toledo, Ohio; George A. Dean, Kansas City, Mo.

[73] Assignee: Libbey-Owens-Ford Company, Toledo, Ohio

[22] Filed: July 20, 1970

[21] Appl. No.: 56,529

[52] U.S. Cl.................................214/152, 214/1 BV, 214/7, 271/69
[51] Int. Cl........................................................B65g 57/28
[58] Field of Search....................214/1 Q, 1 BD, 1 BV, 1 S, 7, 214/6 BA, 6 FS, 91, 152; 271/87, 69

[56] References Cited

UNITED STATES PATENTS

| | | | |
|---|---|---|---|
| 3,519,144 | 7/1970 | Calistrat | 214/6 BA |
| 3,279,664 | 10/1966 | Lynch | 214/7 X |
| 2,441,757 | 5/1948 | Doering et al. | 214/7 X |
| 3,534,872 | 10/1970 | Roth et al. | 214/8.5 C |
| 3,326,547 | 6/1967 | Walters et al. | 214/1 BV |
| 3,434,602 | 3/1969 | Vann | 214/1 Q |
| 3,448,868 | 6/1969 | Hartzell | 214/7 |
| 3,410,425 | 11/1968 | Guillaume | 214/7 |

Primary Examiner—Robert J. Spar
Attorney—Collins and Oberlin

[57] ABSTRACT

This application discloses transferring glass sheets from a horizontal conveyor to a vertical storage buck by permitting each sheet to ride over and drop off a driven roll at the discharge end of the conveyor and onto the angled face of a vacuum platen which receives, aligns and retains it. The sheet is then carried forward by the platen, swung from the receiving to a stacking angle and released, whereupon the conveyor and platen index themselves rearwardly and the platen returns to receiving position.

8 Claims, 21 Drawing Figures

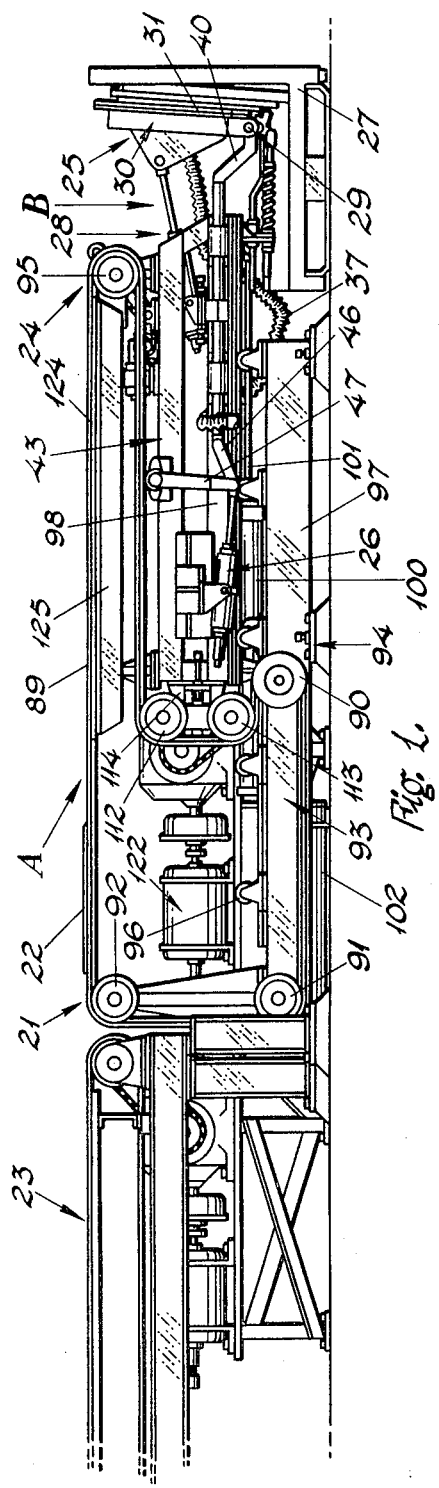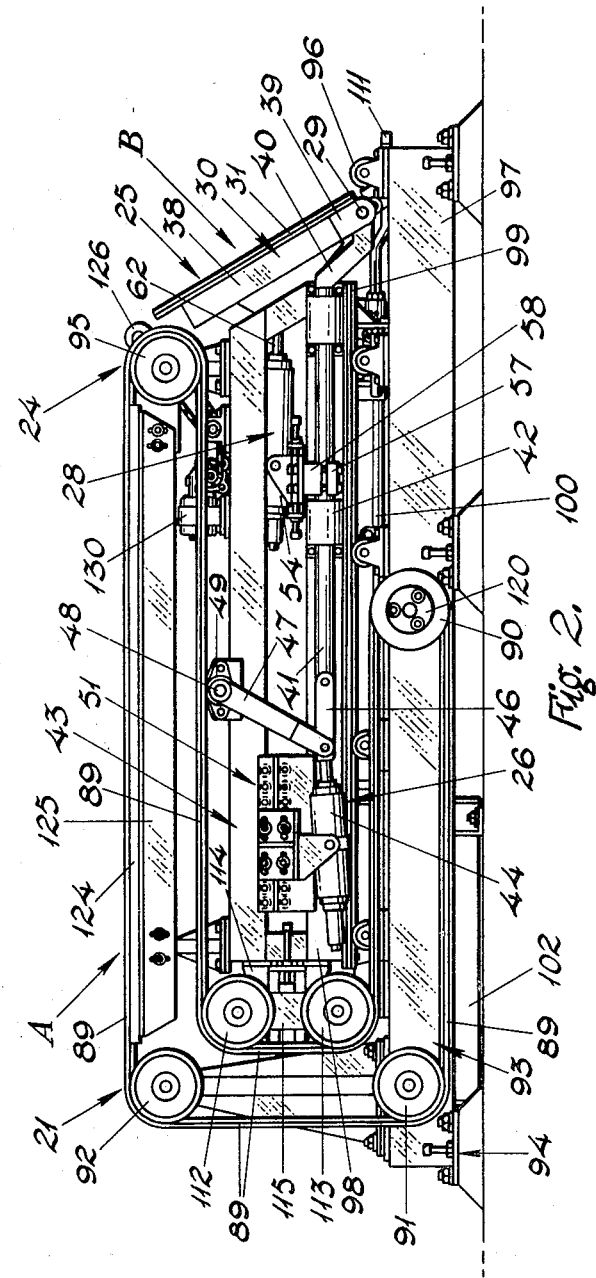
Fig. 1.
Fig. 2.

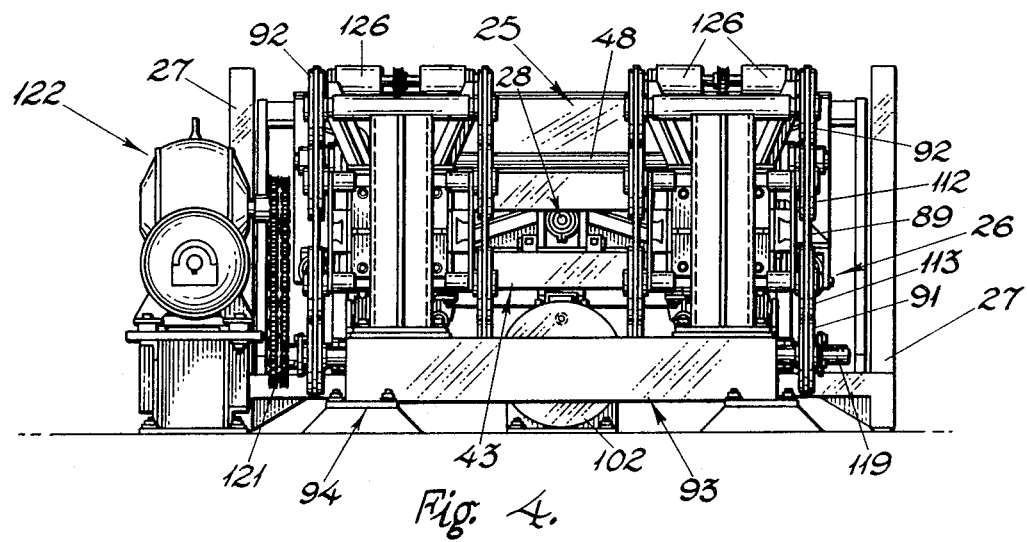
Fig. 4.
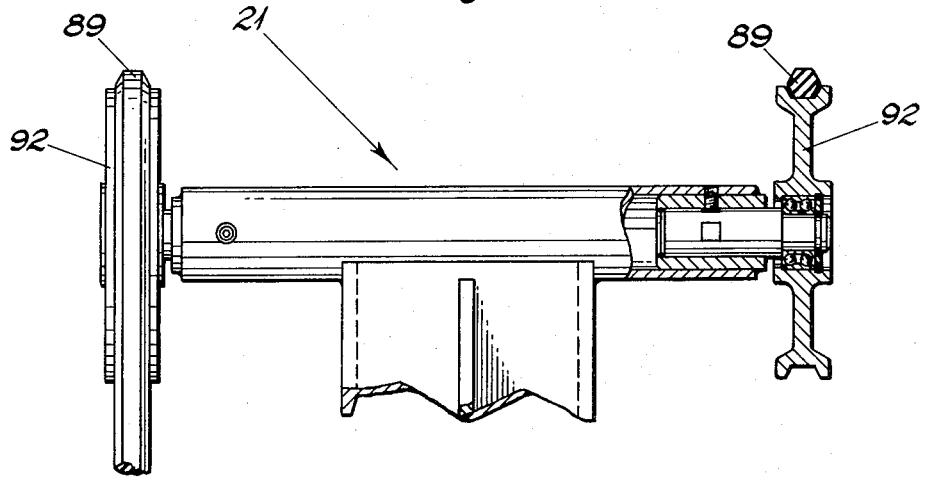
Fig. 9.
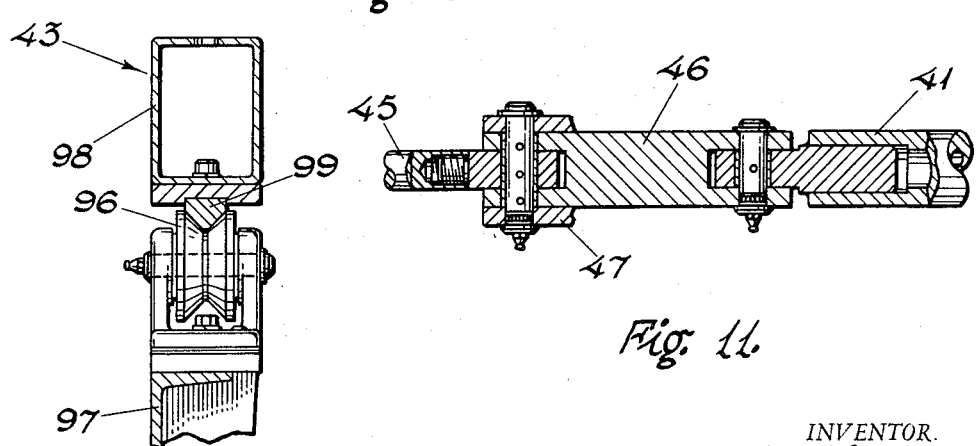
Fig. 10.
Fig. 11.
INVENTOR.
Alfred H. Miller and
BY George A. Dean
Collins & Oberlin
ATTORNEYS

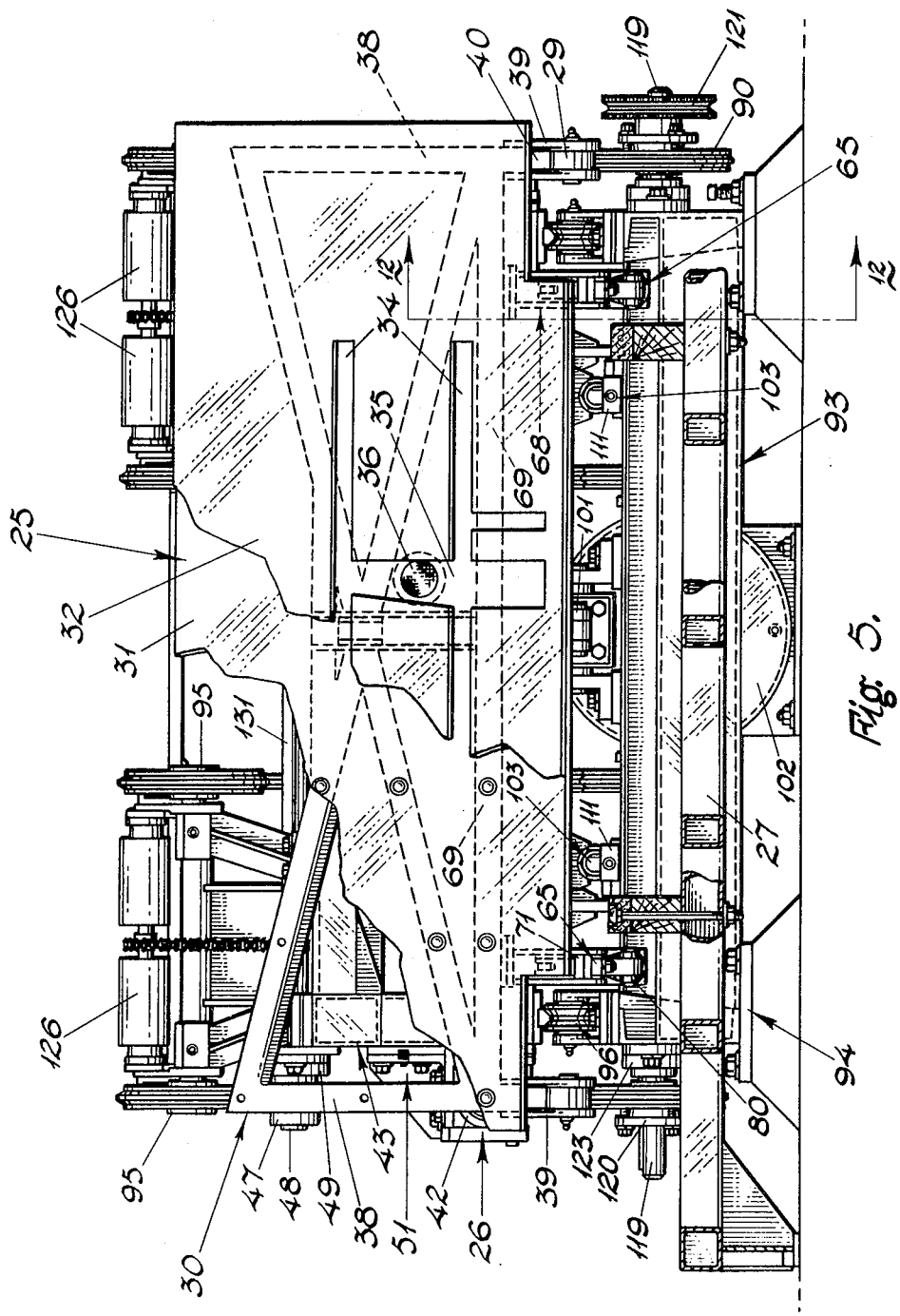

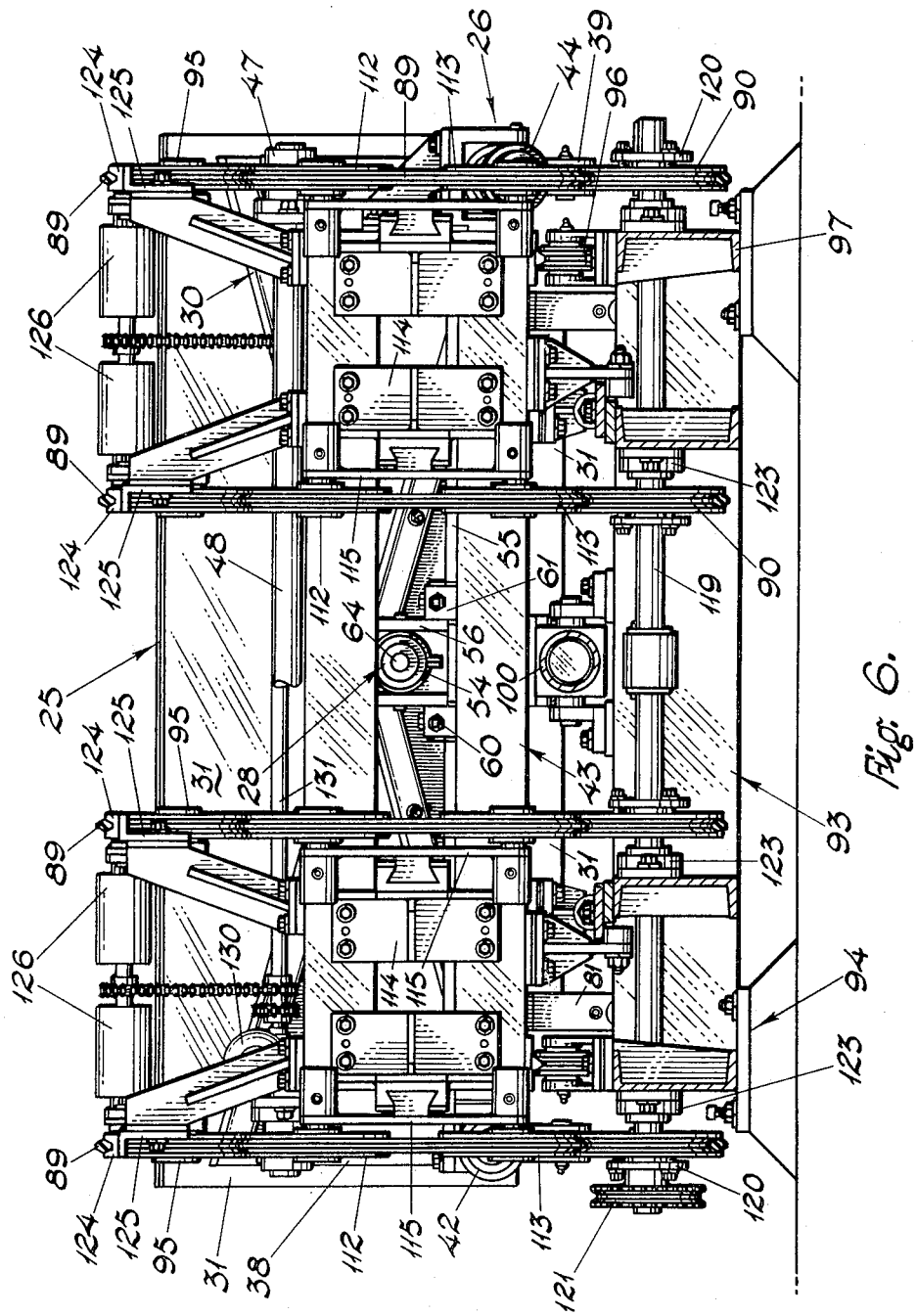

INVENTOR.
Alfred H. Miller and
BY George A. Dean
Collins & Oberlin
ATTORNEYS

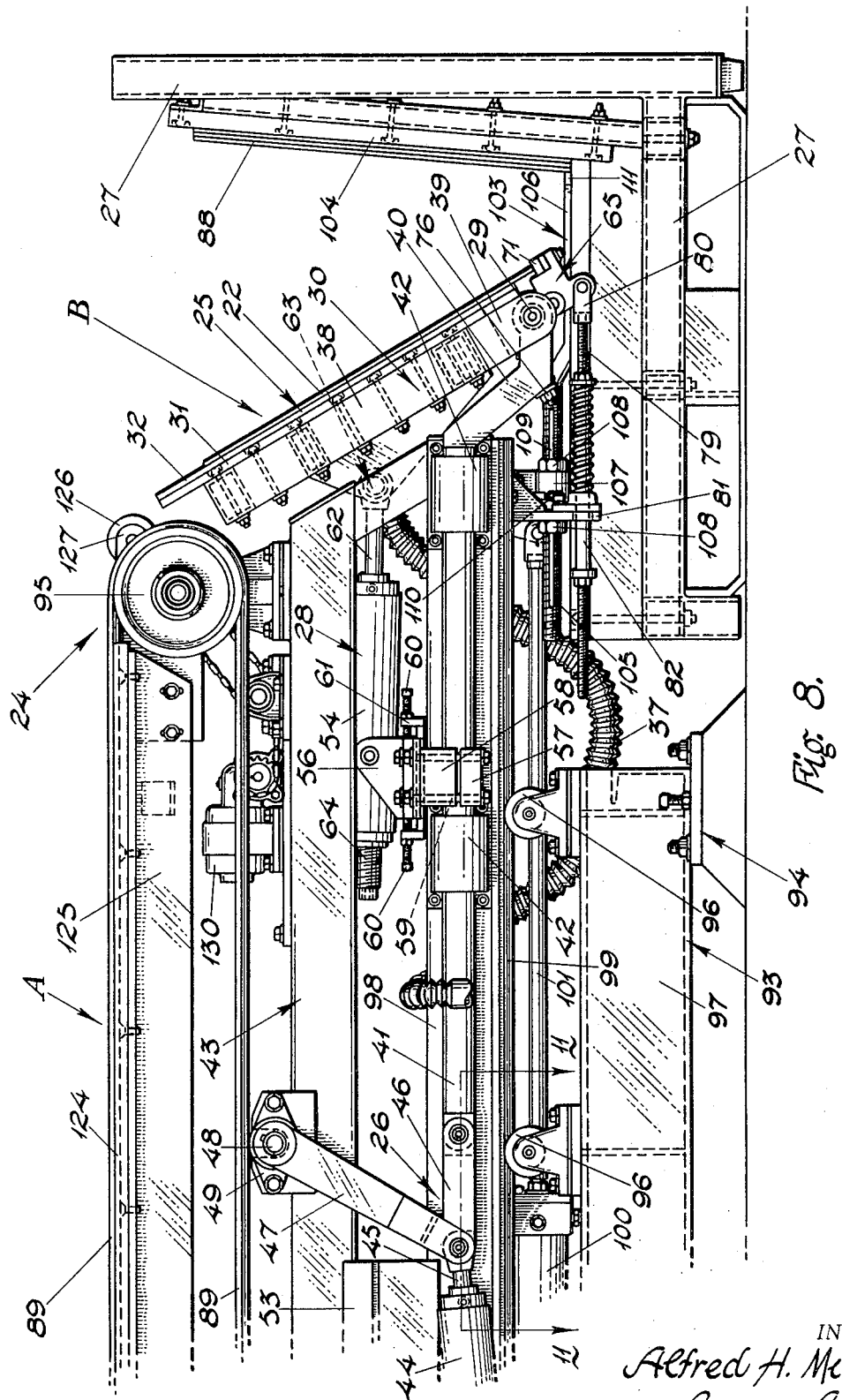

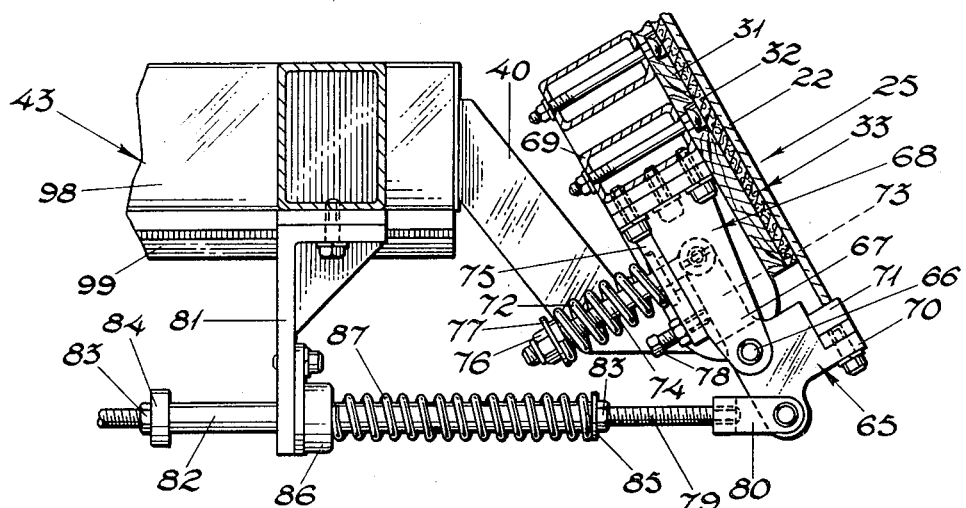
Fig. 12.
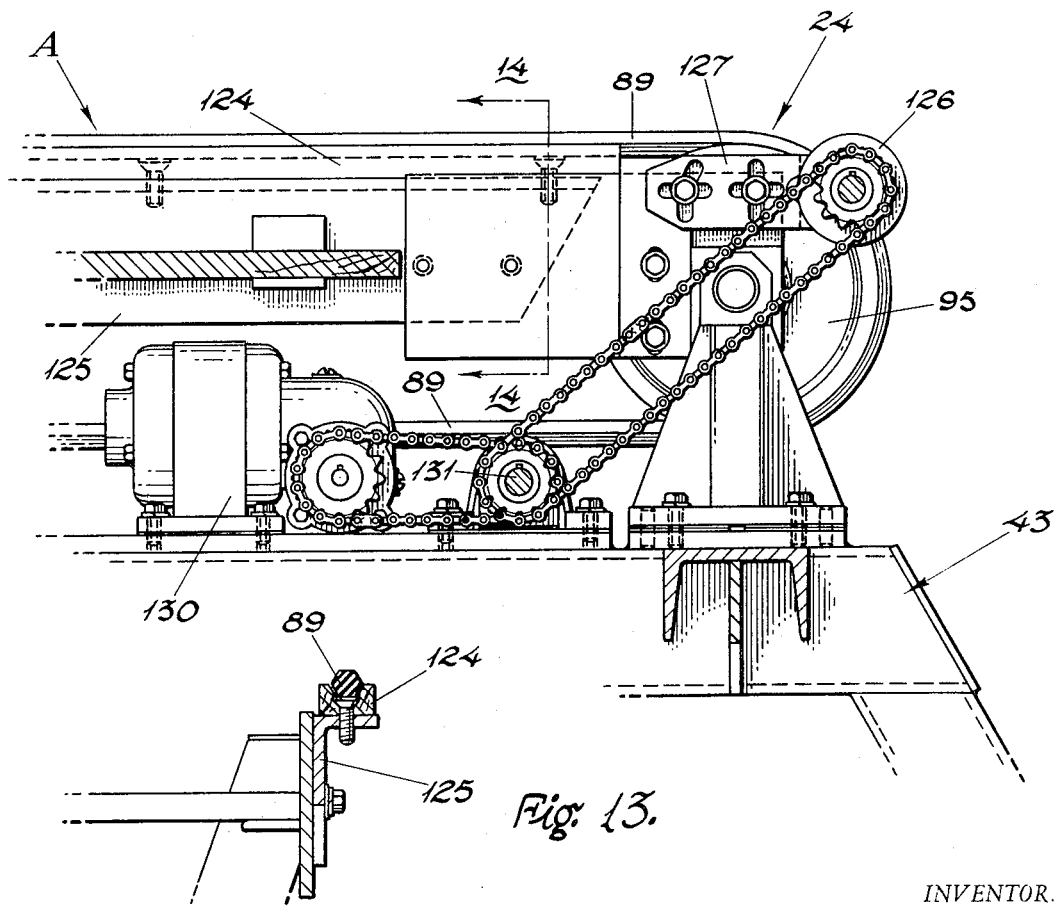
Fig. 13.
Fig. 14.
INVENTOR.
Alfred H. Miller and
BY George A. Dean
Collins & Oberlin
ATTORNEYS

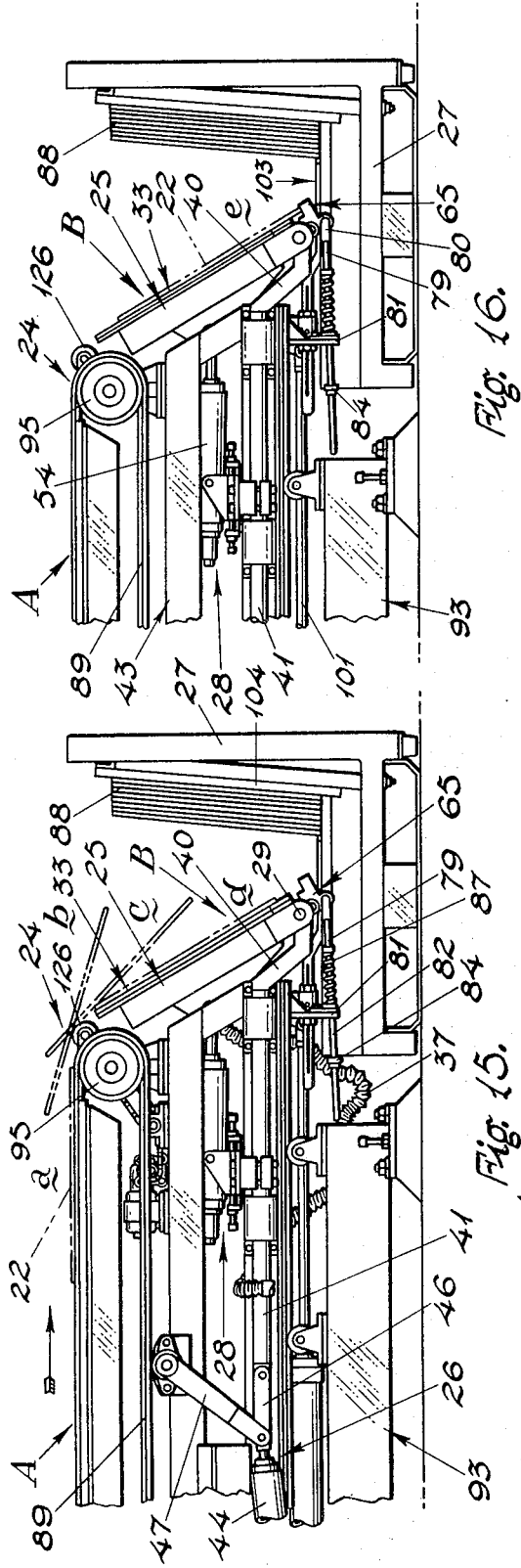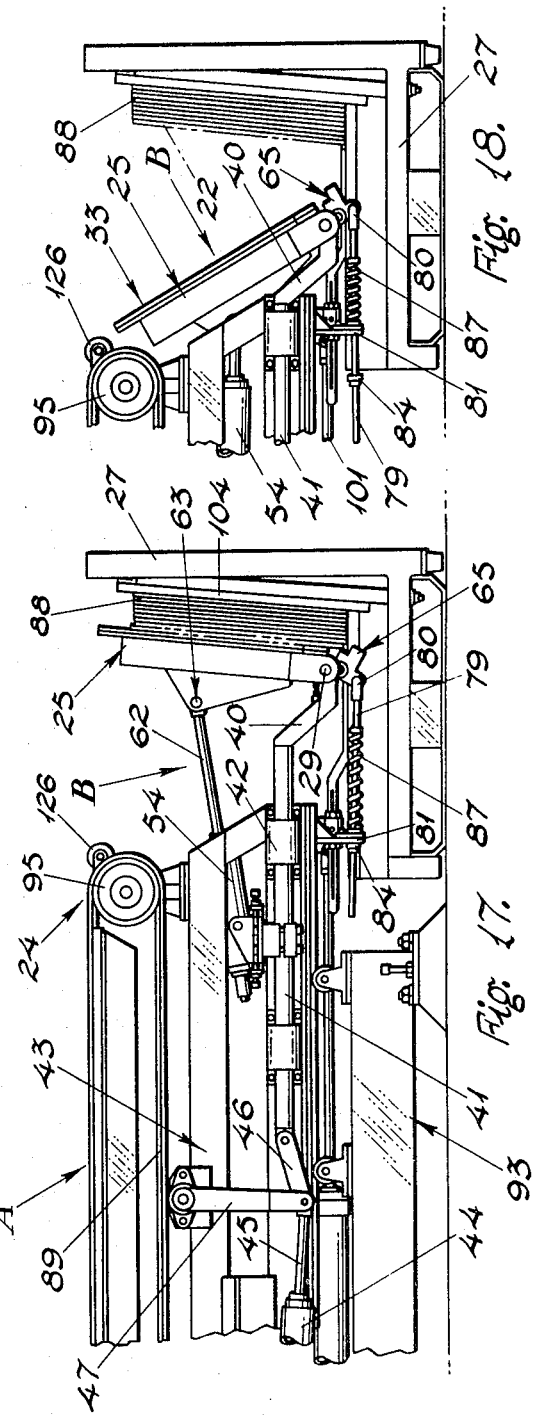

3,679,076

1

METHOD AND APPARATUS FOR HANDLING SHEET MATERIAL

BACKGROUND OF THE INVENTION

1. Field of the Invention

The invention relates generally to the handling of sheet materials and more particularly to an improved method of and apparatus for transferring sheets from a given plane in one location to another plane in a different location.

While not limited thereto, the invention has proved particularly valuable in handling frangible materials such as glass and will be specifically described in that connection here.

2. Description of the Prior Art

In fabricating articles from sheet or plate glass on a high-volume production basis such as that encountered in producing glazing closures for automobiles, it is often necessary to remove sheets from a conveyor for example, where they are supported horizontally, and to stack them on edge and substantially vertically in a storage area.

Heretofore this type of transfer has been carried out either by hand, which is costly and hazardous, or by employing suction lifting frames, which are best suited to large plate handling and are inherently slow and cumbersome.

SUMMARY OF THE INVENTION

The present invention, on the other hand, provides a method and apparatus whereby sheet material in a wide variety of sizes and shapes can be rapidly and accurately handled. For example it has been successfully used in handling, and stacking automobile windshield blanks being discharged from the end of a conveyor at the rate of one every 2 seconds.

Generally speaking the method of the invention involves automatically receiving a sheet from a source of supply, aligning it, carrying the aligned sheet forwardly toward and swinging it into discharge position, and then releasing it; while the apparatus includes a vacuum platen for receiving and manipulating the sheet, together with means for locating the sheet on the platen and for indexing the platen to successively adjacent sheet releasing positions.

An important object of the invention is to provide a method and apparatus of the above character that will permit glass sheets to be handled without injury thereto and that will insure the handled glass being stacked in a manner to minimize breakage thereafter.

Another object is the provision, in connection with such an apparatus, of a horizontal conveyor and a driven drop-off roll at the discharge end of the conveyor for controlling the speed at and the position in which sheets are supplied to the receiving platen.

Another object is to provide a transfer apparatus that includes receiving, conveying, stacking and indexing means embodied in a single unitary structure and that can be incorporated in or used in conjunction with conventional processing, conveying, storing and/or handling systems.

Another object is the provision in such an apparatus of means for automatically indexing the same backwardly as it stacks successive sheets in face to face relationship and for maintaining such sheets tightly stacked together.

Further objects and advantages will become apparent during the course of the following description when taken in connection with the accompanying drawings.

In the drawings, wherein like numerals refer to like parts throughout:

FIG. 1 is a side elevation of a transfer apparatus constructed in accordance with the invention and shown as positioned between a conventional feed conveyor and a storage buck with its platen in position to stack the first sheet on the buck;

FIG. 2 is a similar view of the transfer apparatus but showing it indexed to its completely retracted position and with its platen in sheet receiving position;

FIG. 4 is an end view of the transfer apparatus looking from the feed conveyor toward the storage buck;

2

Figure 3:
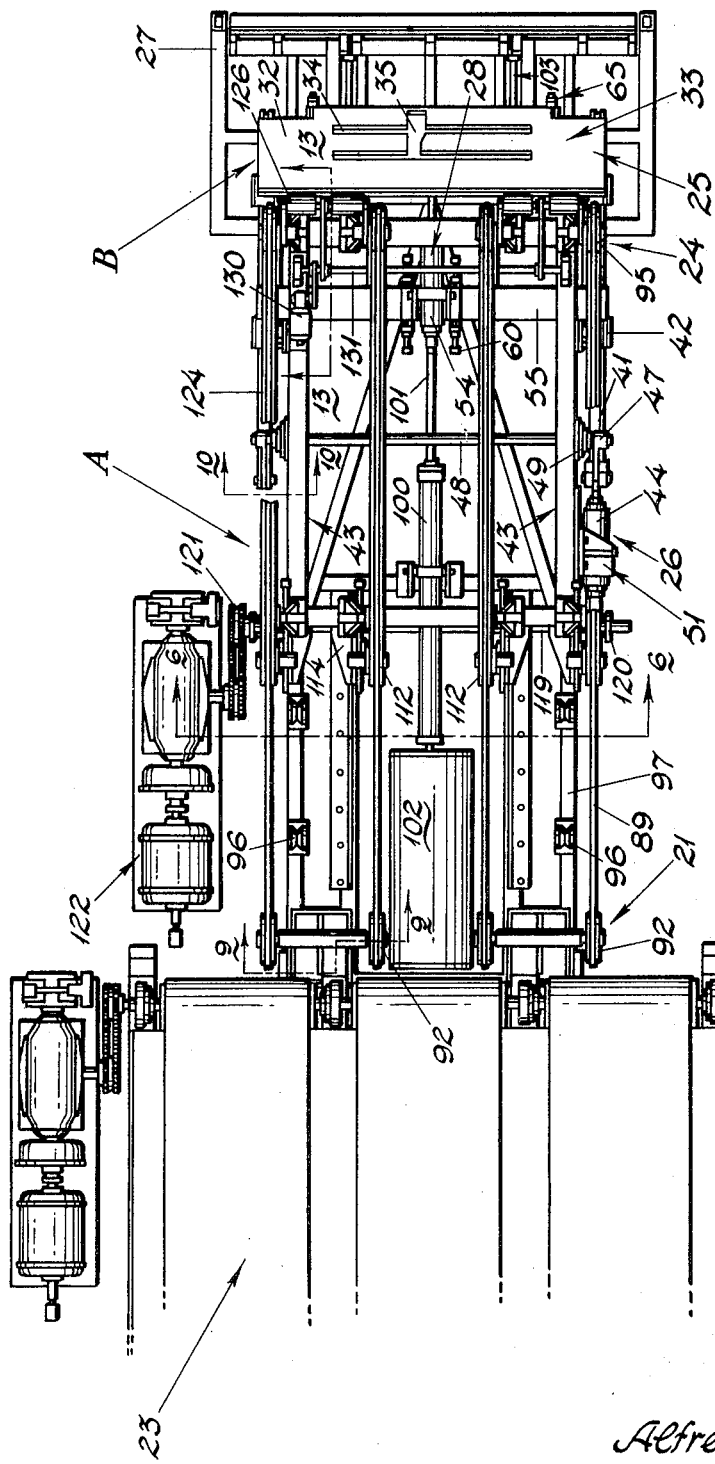
FIG. 3 is a plan view of the structure shown in FIG. 1.
Figure 7:
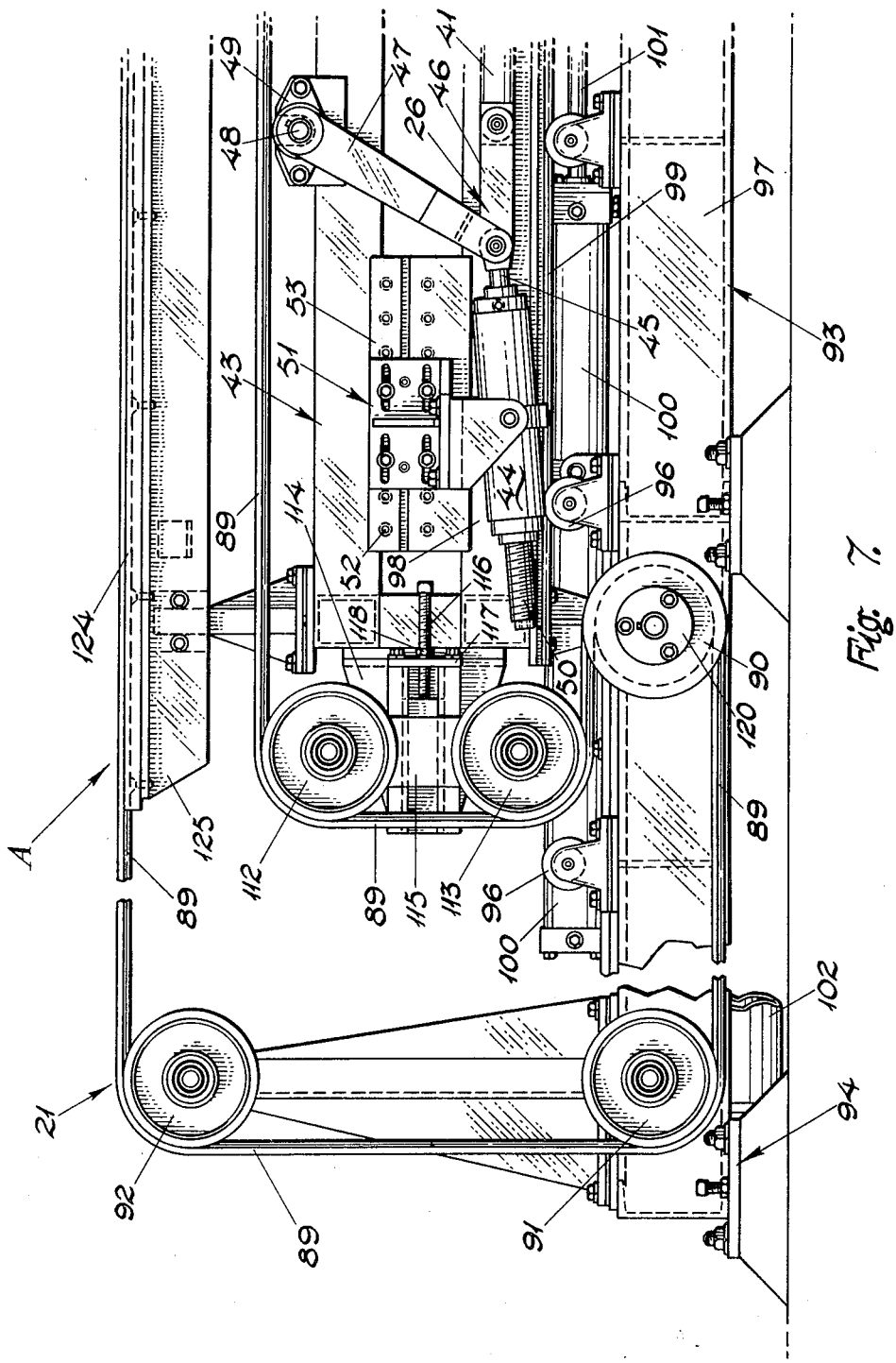
Figure 19:
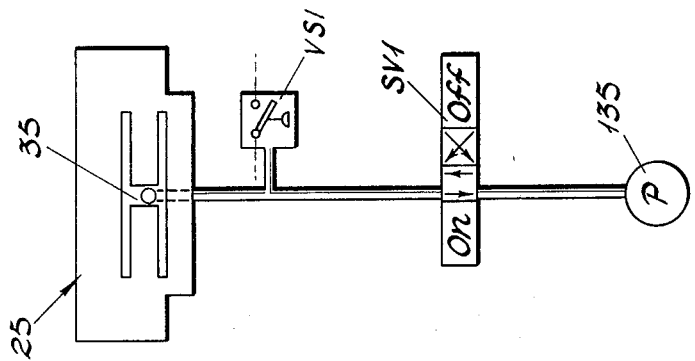
Figure 20:
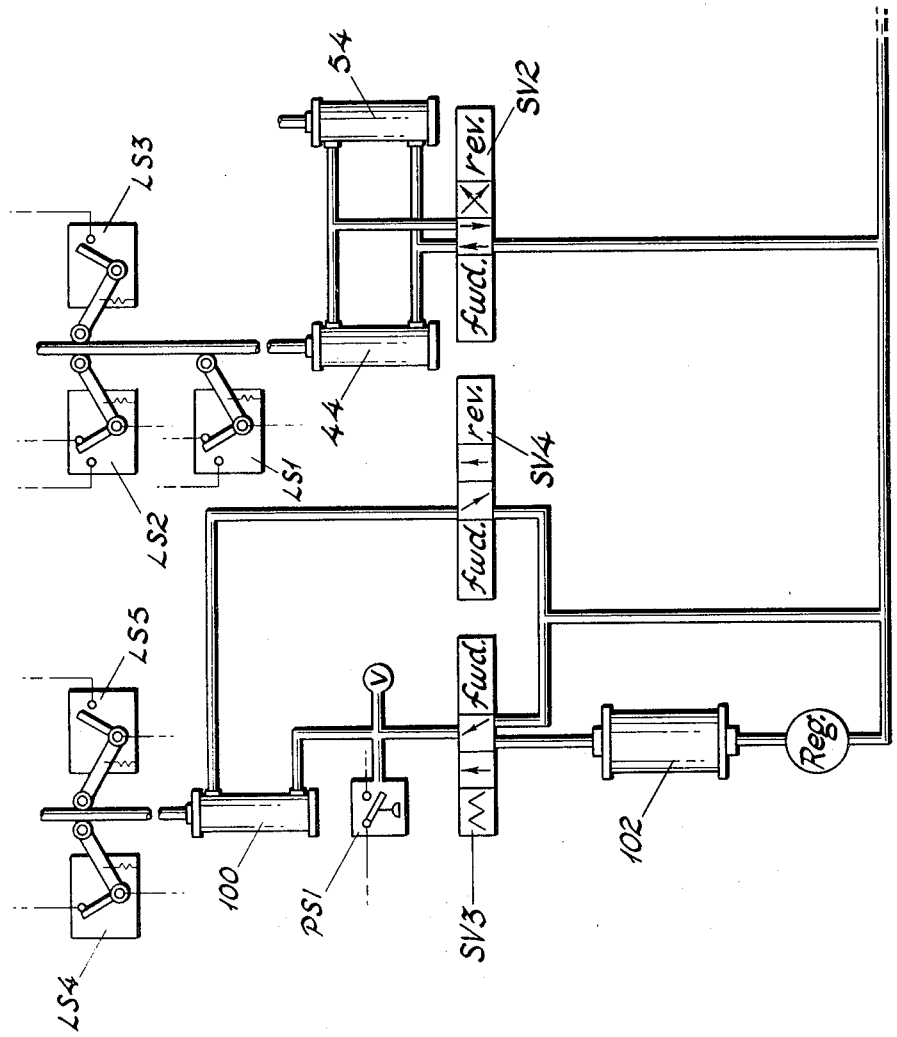
Figure 21:
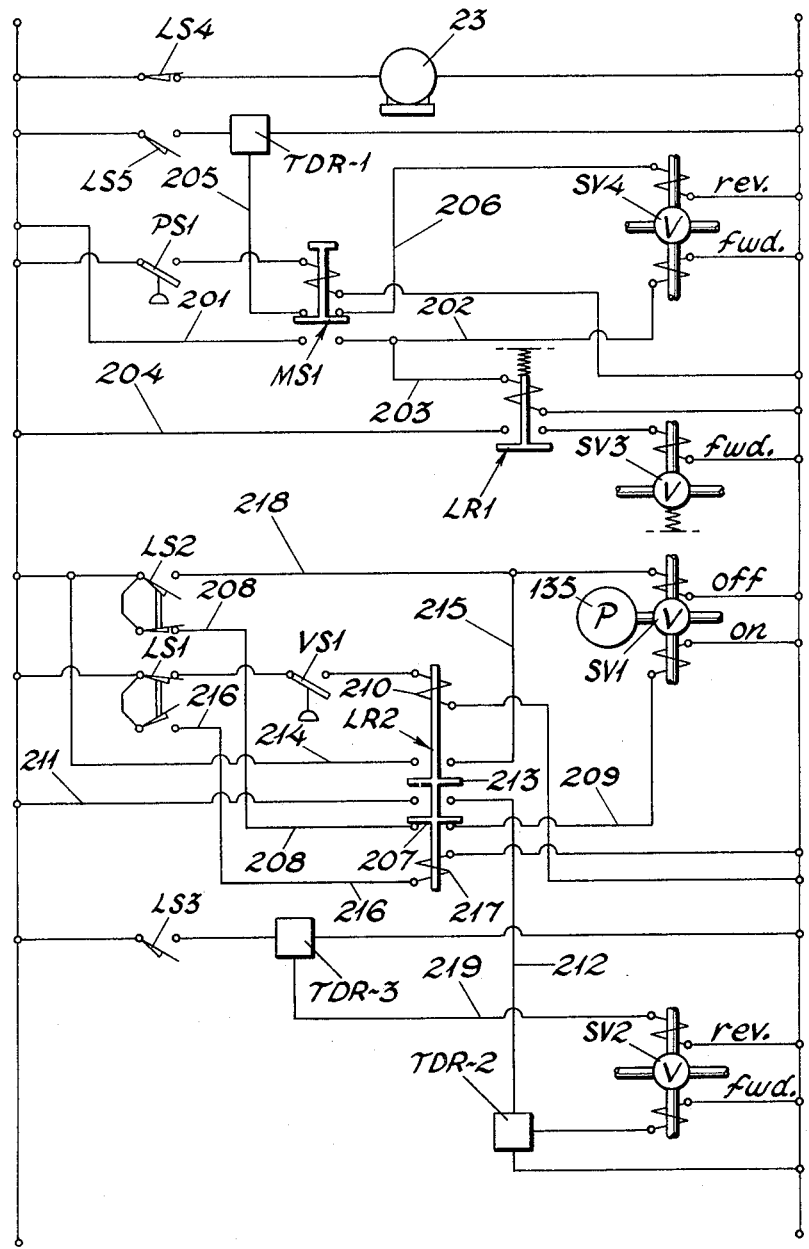

FIG. 5 is an end view on an enlarged scale of the transfer apparatus, looking from the buck toward the feed conveyor and with portions broken away;

FIG. 6 is a transverse sectional view on an enlarged scale taken substantially along the line 6—6 in FIG. 3;

FIG. 7 is a side elevation of the input end of the transfer apparatus similar to that shown in FIG. 1 but on an enlarged scale and with parts broken away;

FIG. 8 is a similar view of the stacking end of the apparatus and with the platen in receiving position;

FIG. 9 is a transverse sectional view taken substantially along the line 9—9 in FIG. 3;

FIG. 10 is a fragmentary sectional view taken substantially along the line 10—10 in FIG. 3;

FIG. 11 is a fragmentary sectional view taken substantially along the line 11—11 in FIG. 8;

FIG. 12 is an enlarged fragmentary sectional view of the sheet edge supporting means on the platen and taken substantially along the line 12—12 in FIG. 5;

FIG. 13 is an enlarged, fragmentary, longitudinal, sectional view taken substantially along the line 13—13 in FIG. 3;

FIG. 14 is a transverse sectional view taken along the line 14—14 in FIG. 13;

FIG. 15 through 18 are side elevations similar to FIG. 8 but illustrating various stages of a complete operational cycle for the transfer apparatus;

FIG. 19 is a schematic diagram of one type of vacuum actuating system for the platen;

FIG. 20 is a schematic diagram of one type of air actuating system that may be provided; and FIG. 21 is a schematic wiring diagram for the control system.

DESCRIPTION OF THE PREFERRED EMBODIMENTS

Referring now more particularly to the drawings, a preferred embodiment of the invention is illustrated therein as a transfer apparatus interposed in and forming part of a complete processing, conveying, handling and storing system.

Thus, as shown in FIG. 1, the transfer apparatus comprises generally a conveyor section A which is adapted to receive and support successive sheets in the horizontal plane while advancing them along a definite path, and a handling section B for receiving individual sheets from the section A and transporting them to and stacking them substantially vertically in another area.

More specifically, the conveyor section A has an entrance or input end 21 to which glass sheets 22 can be supplied, as from a feed conveyor 23, and a discharge end 24 from which the sheets are dropped onto a platen 25 of the handling section B (see FIG. 15).

The handling section B comprises the receiving platen, 25, already referred to, an actuator 26 which is adapted to translate the receiving platen horizontally toward and away from a storage buck 27, and another actuator 28 which rotates the receiving platen about a pivot point 29

The receiving platen 25 is made up of a supporting framework 30, carrying a flat, rigid plate 31, which can be wood or metal having a facing 32 (FIG. 12) of a relatively soft, non-abrasive material, such as felt, to provide a glass supporting surface 33.

As best shown in FIG. 5, the facing 32 has a cut-out portion 34 which forms a cavity 35 in the glass supporting surface. A hole 36 formed in the plate 31 communicates with the cavity 35 and a fitting is attached to the back of the plate 31 over the hole 36 to connect the cavity to a vacuum source (not shown) via a flexible hose 37. The cavity 35 is so shaped and located that it will be covered by a sheet 22 sliding down the surface 33 and, when this happens a vacuum will be created in the cavity which results in a pressure differential across the sheet due to the atmospheric pressure acting on its outer surface. The size of the cavity and the capacity of the vacuum source are such as to produce a force capable of stopping a sheet as it slides down the surface 33 and of retaining it on the surface. Also the cavity is designed and distributed across the facing in a manner not to cause undue pressure concentration in any area of the glass and to tend to maintain the sheets relatively straight on the surface of the platen.

The frame 30 is made up of a plurality of box-section rails with each of the end rails 38 (FIG. 5) having an extending portion to which are welded or otherwise attached pairs of plates to form yokes 39 which are drilled and reamed to serve as bearings about which the frame can pivot or swing. Thus, the frame 30 is carried by L-shaped arms 40 (FIGS. 1, 2, 8 and 12) which are extensions of rods 41 received in linear bearing blocks 42 attached to a movable main frame 43. The arm and rod arrangement is the same on both sides of the fame and each arm 40 ends in an eye and is connected to the yoke 39 by means of a pin at the pivot point 29.

The bearing blocks 42 support the rods 41 for back-and-forth movement provided by the actuator 26, which comprises a pressure cylinder 44 also mounted on the frame 43 and having its ram 45 connected to the rod 41 by a link bar 46. Only one cylinder is employed so, to transfer the motion to the other side of the platen 25, a crank arm 47 is provided that has one end pivotally connected to the ram 45, along with the link bar 46, and the other end fixed to a pivot bar 48 that extends across the conveyor section (see FIG. 3) and is journaled in bearings 49 mounted on a portion of the frame 43. On the other side of the conveyor a similar crank arm and link transfer the motion of the ram 45 to the rod 41 so that the receiving platen 25 will maintain its alignment with the conveyor as it moves toward and away from it.

The amount of linear movement of which the receiving platen is capable is determined by the stroke of the ram 45 and can be adjusted by means of a screw 50 (FIG. 7) at the rear of the cylinder 44. Further adjustment is provided by mounting the cylinder 44 to the frame 43 by a bolt and slot arrangement designated by numeral 51 and which includes a plurality of mounting holes 52 in a mounting plate 53 secured to the frame 43.

The pivoting motions of the receiving platen 25 is provided by another pressure cylinder 54 (FIG. 8) which is mounted on the rods 41 to move therewith and with the linear movement of the receiving platen 25 so that the pivoting action of the platen will be independent of its linear movement or location. The mounting arrangement for the cylinder 54 (FIGS. 3,8) comprises a tie bar 55 on which the trunnion bracket 56 of the cylinder rests, and clamping blocks 57 and 58 which are fastened to either end of the tie bar 55 and clamped around the rods 41 by means of bolts 59. The trunnion bracket 56 is centrally mounted on the tie bar (FIG. 3) by means of a bolt and slot arrangement and fore-and-aft adjustment is made by selectively loosening or tightening four screws 60 which are received in threaded plates 61 that are fixed to the tie bar and bear against the edges of the bracket 56. The cylinder 54 pivots on its trunnion mount and its ram 62 is pivotally connected at 63 to the frame 30 of the receiving platen 25. The stroke of the ram can be adjusted by means of a screw 64 at the rear of the cylinder.

This mounting arrangement allows the platen to be moved from its receiving position (FIG. 15), in which its upper end is adjacent the exit end 24 of the conveyor and its lower end is spaced away to locate the platen at approximately a 30° angle to the vertical, to its stacking position (FIG. 17) in which the entire platen has been translated away from the conveyor end its upper portion has been rotated to the right to cross the vertical and locate the platen in position to deposited a sheet on the buck 27.

Although the vacuum means within the receiving platen is capable of stopping a sheet as it falls off the end of the conveyor (FIG. 15) and of effectively retaining it against the platen during manipulation, it is generally preferred to provide mechanical means for supporting the sheet from an edge as well. Such means may be in the form of catches, designated by the numeral 65 (FIGS. 5 and 8) which will also act to insure that the sheets will be properly aligned on the receiving platen 25 in case the vacuum system fails to stop the sheets in perfect alignment every time.

Two of the catches 65 are sufficient when spaced apart along the bottom edge of the receiving platen 25 and located inwardly a short distance from the yokes 39 (See FIG. 5). The two catches are identical and, referring to FIGS. 5 and 12, each is pivotally attached as at 66 to a yoke portion 67 of a bracket 68, which is bolted to the underside of the lower rail 69 of the receiving platen frame 30 and has a sheet receiving portion 70 which protrudes outward beyond the facing 32 on the plate 31. The portion 70 is provided with a pad 71, of a resilient, non-abrasive material which in the illustrative embodiment is made up of a piece of 32-durometer polyurethane bonded to a steel backing and bolted to the catch.

To maintain each of the catches 65 in its normally protruding or raised and receiving position, a spring 72 is operatively associated therewith in a manner tending to rotate it counterclockwise about the pivot point 66 toward the position shown in FIG. 12. To this end, the catch 65 carries an extended portion 73 in the form of a clevis which extends upward within the yoke portion 67 of the bracket 68. A rod 74 is received within the clevis and extends through a hole provided in a flat plate 75 which spans and is fastened to the yoke 67. The spring 72 surrounds the rod and is larger than the hole so that it bears against the plate 75 and is compressed by a nut 76 and washer 77 at the end of the rod 74. Compression of the spring 72 against the plate 75 tends to pull the rod 74 to the left or counterclockwise as viewed in FIG. 12, thus maintaining the catch 65 in its raised position. A screw 78 threaded through the plate 75 bears against the extended portion 73 of the catch and can be used to limit the amount of counterclockwise movement and so adjust the receiving position of the catch.

To move each catch 65 from its raised, receiving position as shown in FIGS. 15 and 16 to its lowered, sheet edge releasing position as shown in FIG. 17, advantage is taken of the translation of the receiving platen 25. Referring again to FIG. 12, a threaded rod 79 is pivotally attached to the catch 65 below the pivot point 66 by means of a clevis 80. The rod extends back toward the frame 43 through a bracket 81 attached to the frame. A tube 82 fits over the rod and is retained thereon by locknuts 83 bearing on a collar 84 on the side behind the bracket 81 and on a washer 85 on the opposite side. A bearing block 86 attached to the bracket 81 receives the tube and supports the assembly for back-and-forth movement.

When the receiving platen 25 is moved to the right (FIGS. 16 and 17) by the cylinder 44 acting on the arms 40 the rod 79 (see FIG. 12 also) moves with the platen, sliding through the bearing 86 which is carried by the bracket 81 on the frame 43 and so remains stationary. As the platen 25 approaches the limit of its forward travel the collar 84 contacts the back of the bracket 81, stopping the rod 79, and continued movement of the platen 25 causes the catch 65 to rotate clockwise against the force of the spring 72 to the lowered position shown in FIG. 17, allowing a sheet supported on the platen 25 to slide off. When the platen 25 returns toward its receiving position the spring 72 will cause the catch to move back to its raised position (FIG. 18).

To provide an additional holding force to the catch 65 when the receiving platen 25 is in its receiving position (FIG. 15), a second compression spring 87 surrounds the tube 82 and is interposed between the bearing block 86 and the washer 85 at the end of the tube. This assists the spring 72 in maintaining the catch raised when a sheet drops onto it, after sliding over the platen. Of course when the platen subsequently reaches the depositing or stacking position shown in FIG. 17 this additional force is not required and at that time the spring 87 will be relaxed by reason of the tube 82 having moved forwardly through the bearing 86.

Referring to FIGS. 15 through 18, which depict a typical operational cycle, a sheet 22, moving along the conveyor section A in the direction of the arrow in FIG. 15, reaches the discharge end 24 and falls onto the platen 25 through a series of positions shown in broken lines and designated by the letters a, b, c and d. In position d the sheet 22 covers the cavity 35 in the glass-supporting surface 33 of the platen and a vacuum will be created in the cavity behind the sheet stopping and holding the sheet against the platen.

Then, by means responsive to decreasing pressure within the cavity, or by other convenient means, the vacuum is interrupted, allowing the sheet to slide down the surface 33 and onto the catches 65 as shown at e in FIG. 16. Once the sheet arrives at position e it is supported and aligned on the catches 65 and the vacuum is restored to again draw the sheet against the platen and retain it in its aligned position.

Next fluid pressure is applied behind the ram 45 of the cylinder 44 to translate the platen 25 to the right as shown in FIG. 17, and at the same time pressure is applied behind ram 62 of pressure cylinder 54 to rotate or tilt the platen about the pivot point 29. As the platen approaches its fully extended position and its stacking angle (FIG. 17) the collars 84 on the catch release rods 79 contact the brackets 81 causing the catches 65 to stop so that continued forward motion of the platen 25 causes the catches to rotate to an out-of-the-way position behind the surface 33 of the platen. At the same time the vacuum is released to allow the sheet 22 to drop off the platen and into stacked position on the buck 27. Once the sheet is dropped, pressure is applied to the opposite end of cylinders 44 and 54 and the platen is returned to its receiving position, as shown in FIG. 18, to receive another sheet.

In the cycle illustrated in FIGS. 15 through 18, the deposited sheet is shown as being added to an already existing stack of sheets 88 on the buck 27. However, regardless of whether this is the case or a fresh stack is being started as shown in FIG. 1, to successively stack a plurality of sheets in the manner described, provision must be made to index or retract the position to be attained by platen 25, in depositing the next sheet, each time a sheet is deposited so as to compensate for the growth of the stack on which the platen is working.

According to the invention, this may be accomplished, first, by providing means for varying the length of the conveyor section A, between a fully extended condition as shown in FIG. 1 and a fully retracted condition as shown in FIG. 2; and, second, by shortening the conveyor a distance equal to the thickness of one glass sheet every time a sheet is deposited or stacked on the buck 27.

To this end, a referring particularly to FIGS. 1, 2, 3, and 9, the conveyor section illustrated is of the type employing a plurality of narrow belts 89 entrained over pulleys and driving pulleys 90 and pulleys 91 and 92 which are associated with the input end 21 of the conveyor are mounted to a stationary main frame 93 rigidly attached to the floor as at 94. Pulleys 95, associated with the discharge end 24 of the conveyor are mounted on the frame 43 which, as previously described, carries the receiving platen 25 and is movable relative to the stationary frame 93 on rollers 96 mounted on the opposed side rails 97 thereof (FIG. 3). As illustrated in FIG. 10, the rollers 96 are V-shaped in cross-section and horizontal side rails 98 of the frame 43 are provided with V-shaped runners 99 which ride in the rollers 96.

Movement of the frame 43 is provided by a pressure cylinder 100 (FIGS. 3, 7, 8) mounted on the stationary frame 93 and having its ram 101 connected to the movable frame 43. The cylinder is designed to move the frame 43 to any extent required between its fully retracted position (FIG. 2) to its fully extended position (FIG. 1).

However, during normal operation sufficient pressure is constantly applied behind the ram 101 to bias the frame 43 toward the buck 27 in the stacking area and this biasing pressure is provided by an air tank 102 carried by the frame 93. To limit the movement of the frame 43 under the biasing pressure, stop rods 103 are provided (FIG. 8) which are fixed to the frame 43 and located to contact the vertical backing surface 104 of the buck 27 or the last sheet in the stack 88, depending on whether a new stack is being formed or whether one or more sheets have already been stacked.

The lengths of the rods 103 is adjusted, relative to the receiving platen 25, so that when the receiving platen is at full extension, (FIG. 17), the sheet-supporting surface 33 of the platen will be slightly beyond the ends of the rods 103.

With this arrangement, each time the receiving platen 25 attains its full extension under pressure from the cylinder 44, to deposit a sheet on the buck 27, the sheet will have contacted and pressed against the backing surface 104 of the buck (or another previously stacked sheet) to force the frame 43 rearwardly on the rollers 96 and against the biasing pressure from cylinder 100. This movement of the frame 43 indexes the entire handling section B by carrying the rods 103 rearwardly to make room for the sheet being carried by the platen so that, when the vacuum in the platen is released, this sheet will drop downwardly into stacking position with its lower edge resting on the horizontal supporting portion of the buck.

Then, when the receiving platen 25 is subsequently moved back to its receiving position by the retracting action of cylinder 44, the biasing cylinder 100 will force the stop rods 103 back up against the sheet that was just deposited on the buck, thus holding the section B in its indexed position and insuring that this latest sheet is stacked tightly against and previously deposited sheets.

Two of the stop rods 103 are adequate when spaced apart along the bottom edge of the receiving platen 25 and adjacent the mechanical catches 65 (FIG. 5). As best seen in FIG. 8, each stop rod comprises a 1-inch diameter rod having a threaded mounting portion 105 and a stop portion 106 which is offset downward so that it just clears the horizontal support surface of the buck 27. The threaded portion of the rod is received in a bracket 107 which is attained to the forward end of the frame 43 and retained therein by means of locknuts 108 which are threaded onto the rod and bear against the opposite ends of the bracket. To prevent the rod from rotating out of position, a slot 109 may be formed in the rod to receive a set screw 110 threaded into the side of the bracket 107, and the position of the end of the rod, relative to the fully extended location of the platen 25 is set by adjusting the position of the locknuts 108 on the rod. The ends of the rods 103 which contact the glass sheets on the buck are provided with pads 111 of a resilient, non-abrasive material, for example a 30-35 durometer urethane, which is screwed or otherwise attached thereto.

Obviously, when the frame 43 is moved relative to the stationary frame 93 as described above, some provision must be made to maintain the conveyor belts 89 taut. As here shown this is accomplished by means of take-up pulleys 112 and 113 (FIGS. 1, 2 and 7) which are mounted on a bracket 114 carried at the rear end of the frame 43. By comparing FIGS. 1 and 2 it will be seen that, as the distance between the input end pulley 92 and discharge end pulley 95 decreases, due to rearward movement of the frame 43, the distance between the take up pulleys 112–113 and the drive pulley 90 increases proportionately. Consequently the relative locations of the various pulleys provide a take-up loop in the belts 89 which insures their remaining taut at all times. To initially tension the belts the take-up pulleys 112 and 113 are mounted for rotation (FIG. 7) on a sliding bracket 115 which is retained in a slot formed in a bracket 114 carried at the end of frame 43. Tightening of the belt is achieved by means of a screw 116 which is threaded through a plate 117, attached to the bracket 114, and which bears against the sliding bracket 115. A jam nut 118 is provided on the screw 116 to maintain its position.

The drive pulleys 90 are all mounted on a through shaft 119 (FIG. 6) by means of flanges 120 and an input pulley 121 is mounted on one end of the shaft to connect the conveyor to a rotary power source 122 (FIG. 3). The shaft 119 is suitably journaled in bearings 123 mounted on the stationary frame 93.

To properly support the belts on their relatively long sheet supporting run between the input and discharge end pulleys 92 and 95, each belt 89 has a support runner 124 (FIGS. 7, 8 and 14) which is suitably mounted on the frame 43 by means of brackets 125 and, as shown in FIG. 14, each runner is grooved to conform to the shape of the belt.

To insure that the sheets 22 will drop off the conveyor onto and in proper alignment with the receiving platen 25, drop-off rolls 126 (FIGS. 6, 13 and 15) are provided between the belts 89 at the discharge end of conveyor section A, and are mounted for both vertical and horizontal adjustment relative to the discharge end of the conveyor by suitable bolt and slot arrangements in support plates 127.

By positioning of the rolls 126, it is possible to control the angle at which the sheets 22 tilt and drop off of the conveyor or section A and fall onto the receiving platen 25 (See FIG. 15). Similarly, although the rolls 126 can be mounted for free rotation and depend on the conveyor belts 90 to drive the sheets onto and over them, they can, and preferably are, driven at a controlled speed slightly faster than the conveyor which results in their being positively drawn off the conveyor to better control the manner in, as well as the speed at, which the sheets drop down onto the platen 25.

As shown in FIG. 13, the drive system comprises a gear motor 130, a transfer shaft 131 (FIG. 6) which links the two pairs of drop-off rolls 126 on opposite sides of the conveyor, and associated sprockets and chains to transmit the power from the gear motor 130 to the transfer shaft 131 and then to the pairs of rolls 126. It has been found that sheets of various sizes and shapes require different drop-off roll speeds for optimum performance, and that speeds below as well as above the conveyor speed may be desirable. The output speed of the gear motor 130 can be varied to meet all of these requirements.

AIR AND VACUUM SYSTEMS

Following through a typical operational cycle, as a sheet 22 (FIG. 15) reaches the exit end 24 of the conveyor section it rides up onto the drop-off rolls 126 and over the edge of the conveyor until it drops and slides down onto the receiving platen 25. Referring to the vacuum diagram (FIG. 19), vacuum pump 135 is normally energized and vacuum solenoid valve SV1 controlling the vacuum on the receiving platen 25 is normally in the "on" position. When the sheet 22 drops onto and slides down the platen 25 far enough to cover the cavity 35, a vacuum is drawn behind the sheet, stopping it short of the mechanical catches 65 (FIG. 15). When a predetermined vacuum is reached a vacuum switch VS1 closes and this causes the solenoid valve SV1 to be shifted to the "off" position allowing the sheet 22 to slide down against the catches 65 (FIG. 8). After a delay of approximately 0.2 second solenoid valve SV2 (FIG. 20), which controls the plate linear and rotary movement cylinders 44 and 54 respectively, is energized in the "forward" position, applying air to the head ends of the cylinders to begin moving the platen 25 from its receiving toward its deposit position. As soon as the platen 25 moves forward, a limit switch LS1 is tripped which, through appropriate circuitry, restores vacuum solenoid valve SV1 (FIG. 19) to the "on" position, thereby restoring the vacuum in cavity 35 so that the sheet 22 is again held on the platen by vacuum during its continuing and subsequent forward and rotary movements.

When the platen 25 reaches the deposit position (FIG. 17) limit switches LS2 and LS3 are contacted, with LS2 causing the vacuum solenoid SV1 to shift to the "off" position to release the vacuum in cavity 35, and LS3 energizing a time delay circuit which, after 0.2 second, shifts the solenoid valve SV2 to the "reverse" position, applying air to the rod ends of cylinders 44 and 54 to translate and pivot the platen 25 back to its receiving position (FIG. 18).

The handling section B, which includes the platen 25 and the associated cylinders 44 and 54, is movable back and forth on the rollers 96 by means of cylinder 100 acting on frame 43. This cylinder is controlled by two solenoid valves SV3 and SV4, with SV3 being designed to supply air to the head end of the cylinder from either the plant air supply, for initial extension of the frame into operating position; or from the tank 102 which is maintained at 8 psi, for biasing the frame toward the receiving means. In operation, SV3 acts to shift the source of the air flow to the head end of cylinder 100 between the plant air supply and the tank 102; while SV4 controls the flow of air to and from the rod end of cylinder 100, either supplying air when SV4 is in the reverse position or exhausting to atmosphere when SV4 is in the forward position.

To start a cycle the solenoid valves SV3 and SV4 are manually energized to their respective forward positions (FIG. 20) by means of a main loader switch MS1 (FIG. 21). The frame 43 will then move forward under about 17 psi pressure until the stop rods 103 contact the backing surface 104 of the buck 27. When the pressure builds up to 20 psi, pressure switch PS1 (FIG. 20) causes SV3 to shift to tank 102 as the source of air and leaves SV4 in its forward, or exhaust position. The tank 102 then maintains a constant 8 psi on the head end of the cylinder to provide the biasing force against the stack of sheets until MS1 is again energized manually.

As the frame 43 moves forward under the influence of cylinder 100 a limit switch LS4 is tripped starting the feed conveyor 23 to transfer sheets to the conveyor section A. As already explained these sheets are transferred to the buck 27 by the coordinated action of cylinders 44 and 54 and the vacuum on the platen 25.

According to one set up, when the buck 27 is loaded to a stack thickness of 24 1½2 (plus or minus one-quarter inches, limit switch LS4 is tripped in the opposite direction to stop the feed conveyor 23 and limit switch LS5 is tripped to complete a time delay circuit which allows enough time for the sheets to clear the handling section B and then energizes SV4 in the reverse position to fully retract the handling section. After the full buck is removed and an empty one put in its place SV3 and SV4 are again actuated manually to start a new cycle.

ELECTRICAL CONTROL SYSTEM

Referring to FIG. 21, the main switch MS includes a push button to initiate a cycle and a trip coil in circuit with the pressure switch PS1 to electrically disengage the push button when required.

In starting a cycle the push button acts to complete circuits through lines 201, 202 and 203 to the forward coil of SV4 and to the coil of latch relay LR1. LR1 is spring loaded in the open position and when its coil is energized its contacts are closed to complete a circuit through line 204 to the coil of SV3 to place it in its forward position.

When 20 psi is reached at cylinder 100, the pressure switch PS1 closes, energizing the coil on MS1 which disengages the pushbutton and breaks the circuits to the forward side of SV4 and to LR1. SV4 will remain in the forward position until the reverse coil is energized; however, SV3 is spring loaded, so that when its forward coil is deenergized, by breaking of the circuit through line 204, it is automatically shifted to the tank 102 (see FIG. 20).

When limit switch LS5 is closed by filling of the buck 27, time delay relay TDR1 is energized. TDR1 allows sufficient time for the loader to clear and then completes a circuit through line 205, the deenergized push button switch and line 206 to the reverse coil of SV4 thus retracting the loader and allowing the buck 27 to be removed. TDR1 allows enough time for full retraction and then times out leaving the reverse coil of SV4 open for the start of another cycle.

As shown in FIG. 21, the circuits controlling the cylinders 44 and 54 and the vacuum pump 135 are in position for the start of a cycle. Circuit breaker 207 on latch relay LR2 is closed to complete a circuit through limit switch LS2, and lines 208 and 209 to the "on" coil of vacuum solenoid SV1. When a sheet covers the cavity 35 to complete the vacuum circuit the vacuum builds up to a selected value at which point vacuum switch VS1 closes, completing a circuit through limit switch LS1 to coil 210 of latch relay LR2. When coil 210 is energized circuit breaker 207 opens the circuit to the "on" coil and closes a circuit via lines 211 and 212 to a time delay relay TDR2, and circuit breaker 213 closes a circuit through lines 214 and 215 to the "off" coil of SV1.

TDR2 delays 0.2 second and then completes a circuit through the "forward" coil of SV2 applying air to the head ends of cylinders 44 and 54 to move the platen 25 from its receiving to its deposit position. When TDR2 times out SV2 remains in the forward position. When LS1 is tripped by the platen 25, a circuit, through line 216 is completed to coil 217 of latch relay LR2 which opens circuit breaker 213 and closes circuit breaker 207 through LS2 and across lines 208 and 209 to again energize the "on" coil of SV1 to restore the vacuum in cavity 35.

When LS2 is tripped by the platen in the deposited position, the circuit to the "on" coil of SV1 is open and a circuit through line 218 completed to energize the "off" coil of SV1 for deposit of the sheets. When LS3 is tripped, a time delay relay TDR3 is energized, which allows a 0.2 second delay and then completes a circuit through line 219 to the "reverse" coil of SV2 to cause the platen 25 to return to its receiving position. As the platen returns, LS1, LS2 and LS3 is returned to their original positions.

It is to be understood that the forms of the invention herewith shown and described are to be taken as preferred embodiments only of the same, and that various changes in the shape, size and arrangement of parts as well as various procedural changes may be restored to without departing from the spirit of the invention.

We claim:

1. A method of handling individual sheets of frangible material which comprises supporting said sheets in a substantially horizontal plane while moving the same in succession along a definite path, progressively discontinuing said support of each successive sheet from the leading to the trailing edge thereof at a predetermined point in said path to cause said sheet to tilt and fall downwardly toward a vertical position, arresting said downward movement after said sheet is at an angle to the horizontal but before it reaches the vertical by catching and holding said sheet in said arrested and angled receiving position, moving said held sheet bodily forwardly from said receiving to a depositing position, then swinging said sheet into a second angled position at the opposite side of the vertical from said first angled position, and then releasing said sheet to deposit the same.

2. A method as defined in claim 1 in which said sheets are moved at one speed toward said predetermined point, and at a different speed as their support is being progressively discontinued to control the angle at which they tilt and fall downwardly.

3. A method as defined in claim 2 in which said sheets are moved at a faster speed as their support is being progressively discontinued.

4. A method as defined in claim 1 in which each successive sheet is moved bodily forwardly toward and is released at a point one sheet thickness short of the point where the preceding sheet was released.

5. A method as defined in claim 1 in which said sheet is held in said angled position from one surface and supported along an edge thereof, and said support is withdrawn from said edge during said bodily forward movement toward said depositing position.

6. A method as defined in claim 5 in which said hold is also withdrawn from said surface after movement into said second angled depositing position to release said sheet.

7. A method as defined in claim 1 in which said sheet is caught and held in said angled position by suction applied to a major surface thereof.

8. A method as defined in claim 7 in which said held sheet is also supported along its lower edge during said forward bodily movement, said edge support is discontinued before said sheet reaches said second angled depositing position, and said suction is released after said sheet reaches said second angled depositing position.

* * * * *